(12) United States Patent
Linn et al.

(10) Patent No.: US 8,511,964 B2
(45) Date of Patent: Aug. 20, 2013

(54) HUMANOID ROBOT

(75) Inventors: Douglas Martin Linn, White Lake, MI (US); Robert O. Ambrose, Houston, TX (US); Myron A. Diftler, Houston, TX (US); Scott R. Askew, Houston, TX (US); Robert Platt, Houston, TX (US); Joshua S. Mehling, League City, TX (US); Nicolaus A. Radford, League City, TX (US); Phillip A. Strawser, Houston, TX (US); Lyndon Bridgwater, Houston, TX (US); Charles W. Wampler, II, Birmingham, MI (US); Muhammad E. Abdallah, Houston, TX (US); Chris A. Ihrke, Hartland, MI (US); Matthew J. Reiland, Oxford, MI (US); Adam M. Sanders, Holly, MI (US); David M. Reich, Huntsville, AL (US); Brian Hargrave, Dickenson, TX (US); Adam H. Parsons, Tulsa, OK (US); Frank Noble Permenter, Webster, TX (US); Donald R. Davis, Brighton, MI (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 612 days.

(21) Appl. No.: 12/564,084

(22) Filed: Sep. 22, 2009

(65) Prior Publication Data
US 2011/0067521 A1 Mar. 24, 2011

(51) Int. Cl.
*B25J 11/00* (2006.01)

(52) U.S. Cl.
USPC .................. 414/680; 294/106; 294/111

(58) Field of Classification Search
USPC ................ 414/680; 294/106, 111; 623/64
See application file for complete search history.

(56) References Cited

U.S. PATENT DOCUMENTS

| 4,986,723 | A | * | 1/1991 | Maeda | 414/729 |
| 5,100,138 | A | * | 3/1992 | Wilde | 273/440.1 |
| 5,676,157 | A | * | 10/1997 | Kramer | 600/595 |
| 6,244,644 | B1 | | 6/2001 | Lovchik et al. | |
| 2009/0149992 | A1 | | 6/2009 | Ohno | |
| 2009/0321150 | A1 | * | 12/2009 | Kwon et al. | 180/8.6 |

FOREIGN PATENT DOCUMENTS

| JP | 2001138272 A | 5/2001 |
| JP | 2007160448 A | 6/2007 |
| KR | 100788787 B1 | 12/2007 |
| KR | 100797001 B1 | 1/2008 |

OTHER PUBLICATIONS

"DLR Institute of Robotics and Mechatronics Status Report: Scientific Results 2005-2008", report, Jan. 2009, website: http://www.dir.e/rm/en.
http://robotics.nasa.gov/courses/fall2002/event/oct1/NASA_Robotics_20021001.htm.

* cited by examiner

*Primary Examiner* — Donald Underwood
(74) *Attorney, Agent, or Firm* — Quinn Law Group, PLLC

(57) ABSTRACT

A humanoid robot includes a torso, a pair of arms, two hands, a neck, and a head. The torso extends along a primary axis and presents a pair of shoulders. The pair of arms movably extend from a respective one of the pair of shoulders. Each of the arms has a plurality of arm joints. The neck movably extends from the torso along the primary axis. The neck has at least one neck joint. The head movably extends from the neck along the primary axis. The head has at least one head joint. The shoulders are canted toward one another at a shrug angle that is defined between each of the shoulders such that a workspace is defined between the shoulders.

15 Claims, 4 Drawing Sheets

HUMANOID ROBOT

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to a humanoid robot having a plurality of joints.

BACKGROUND OF THE INVENTION

Typical robots are automated devices that are able to manipulate objects using a series of rigid links, which in turn are interconnected via articulations or motor-driven robotic joints. Each joint in the typical robot represents at least one independent control variable, also referred to as a degree of freedom (DOF). End-effectors are the particular links used to perform a task at hand, e.g., grasping a work tool or an object. Therefore, precise motion control of the robot may be organized by the level of task specification: object level control, which describes the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots, in particular, are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. The use of humanoid robots may also be preferred where interaction is required with humans, as the motion can be programmed to approximate human motion such that the task queues are understood by the cooperative human partner. Due to the wide spectrum of work tasks that may be expected of a humanoid robot, different control modes may be simultaneously required. For example, precise control must be applied within the different spaces noted above, as well as control over the applied torque or force, motion, and the various grasp types.

SUMMARY OF THE INVENTION

A humanoid robot is provided that includes a torso, a pair of arms, a neck, and a head. The torso extends along a primary axis and presents a pair of shoulders. The pair of arms movably extend from a respective one of the pair of shoulders. Each of the arms has a plurality of arm joints. The neck movably extends from the torso along the primary axis. The neck has at least one neck joint. The head movably extends from the neck along the primary axis. The head has at least one head joint. The shoulders are canted toward one another at a shrug angle that is defined between each of the shoulders such that a workspace is defined between the shoulders.

In another aspect of the disclosure, a human robot is provided that includes a torso, a pair of arms, a pair of hands, and a skin layer. The torso extends along a primary axis and presents a pair of shoulders. The pair of arms movably extend from a respective one of the pair of shoulders. The shoulders are canted toward one another at a shrug angle defined between each of the shoulders such that a workspace is defined between the shoulders. Each of the arms has a plurality of arm joints. The hands are operatively connected to a respective one of the arms. Each of the hands includes at least five fingers such that each hand has at least twelve degrees of freedom. The skin layer substantially covers the robot.

In yet another aspect of the disclosure, a humanoid robot includes a torso, a pair of arms, a pair of hands, and a head. The torso extends along a primary axis and presents a pair of shoulders. The pair of arms movably extend from a respective one of the pair of shoulders. Each of the arms has at least seven arm joints. The pair of hands movably extend from a respective one of the pair of arms. Each of the hands has at least twelve finger joints. The head movably extends along the primary axis and has at least one head joint. The shoulders are canted toward one another at a shrug angle defined between each of the shoulders such that a workspace is defined between the shoulders.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic illustration of a thumb of the hand of FIG. 3; and.

DESCRIPTION OF THE PREFERRED EMBODIMENT

Figure 1:
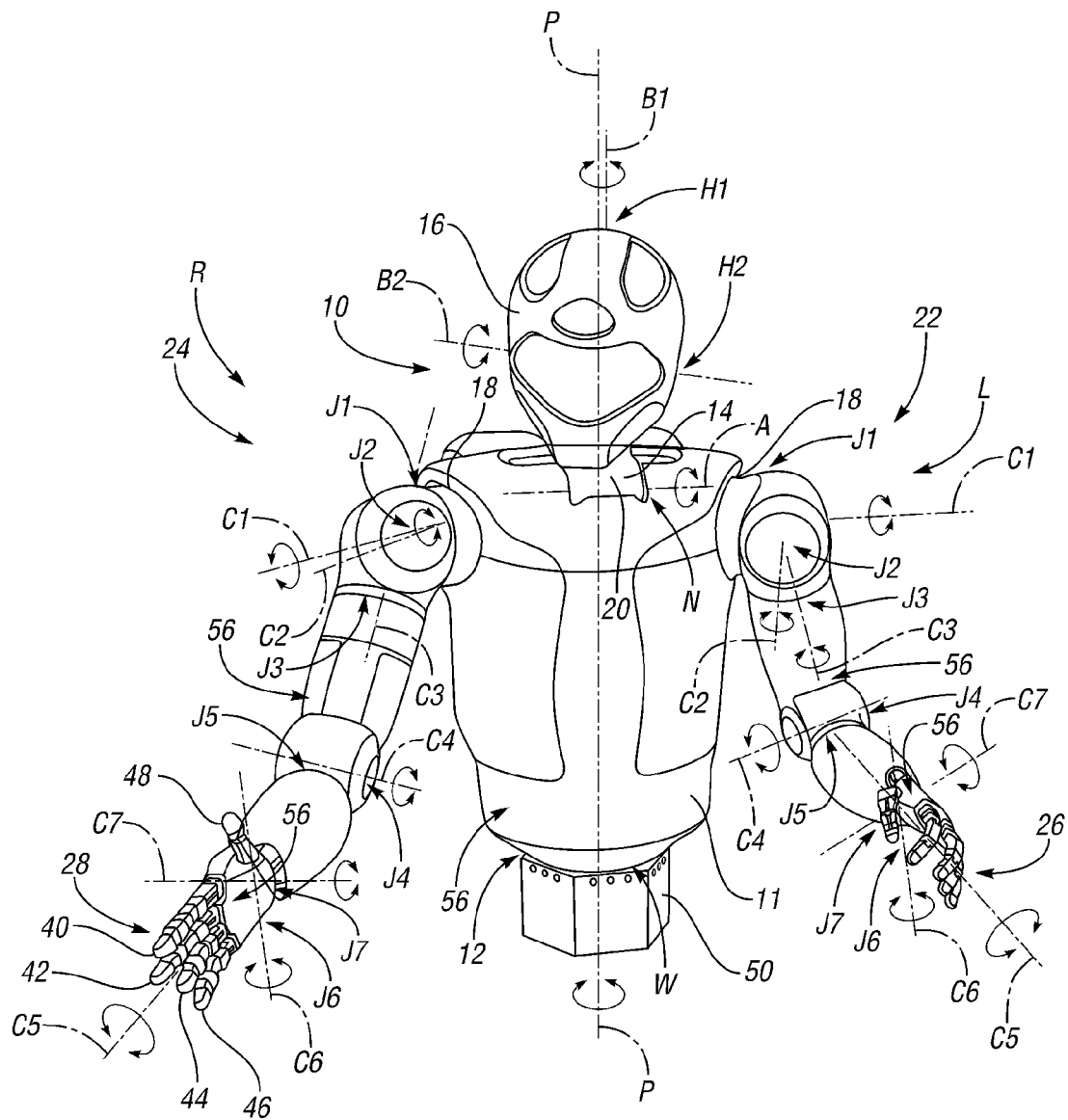
FIG. 1 is a schematic illustration of a humanoid robot having a torso, a neck, a head, a pair of arms, and a pair of hands.

With reference to the drawings, wherein like reference numbers refer to the same or similar components throughout the several views, FIG. 1 shows a dexterous humanoid robot 10 having a plurality of joints that are adapted to perform one or more tasks with multiple degrees of freedom (DOF). The multiple DOF provides the robot 10 with a level of dexterity required to manipulate standard tools and assembly components. Each robotic joint contains and/or is driven by one or more actuators (not shown), e.g., joint motors, linear actuators, rotary actuators, and the like. As a result, the robot 10 is configured to perform significant work. Specifically, the robot 10 is configured to perform assembly, construction, and maintenance tasks that are currently performed by humans. Additionally, the robot 10 may be configured to be of a human scale, allowing the robot 10 to share the same workspaces 30 that are typically designed for human workers.

The robot 10 includes a torso 11 that extends between a waist 12 and a neck 14. A head 16 is operatively attached to the neck 14. More specifically, the torso 11 extends along a primary axis P and presents a pair of shoulders 18 in generally perpendicular relationship to the primary axis P. The neck 14 generally extends along the primary axis P. The neck 14 includes at least one neck joint N that presents a corresponding DOF. The neck 14 includes a neck joint N that is configured to pivot about a neck axis A, relative to the torso 11. The neck joint N may be defined between the torso 11 and a base 20 of the neck 14. The neck axis A extends generally in a perpendicular relationship to the primary axis P. The neck joint N is configured to tilt the neck 14 relative to the torso 11, about the neck axis A. The neck joint N is configured to provide an additional degree of travel to the head 16 to prevent the head 16 from coming into contact with the torso 11 and/or the neck 14 when tilting the head 16 relative to the torso 11.

The head 16 extends from the neck 14, generally along the primary axis P. The head 16 has two head 16 joints that present two corresponding DOF. The head 16 is configured to move at one or more of the head 16 joints, relative to the neck 14, the torso 11, and the primary axis P. More specifically, the head 16 includes a first head joint H1 and a second head joint H2. The first head joint H1 is configured such that the head 16 rotates about a first head axis B1, relative to the neck 14 and torso 11. The first head axis B1 of the first head joint H1 extends in generally perpendicular relationship to the neck axis A. The first head joint H1 is configured such that the head 16 pivots, or pans, about the first head axis B1, relative to the neck 14 and the torso 11. The second head joint H2 is configured such that the head 16 rotates about a second head axis B2, relative to the neck 14 and torso 11. The second head axis B2 of the second head joint H2 extends in generally perpendicular relationship to the first head axis B1 and in a generally parallel spaced relationship to the neck axis A. The second head joint H2 is configured to tilt, or pitch, the head 16 relative to the neck 14, about the second head axis B2. Therefore, together the neck joint N, first head joint H1 and second head joint H2 provide a pitch, roll, pitch arrangement respectively for movement of the head 16 relative to the torso 11.

Additionally, the orientation of the first head axis B1, relative to the torso 11, varies based on the movement of the head 16 about the second head axis B2 and/or the neck 14 about the neck axis A. Likewise, the second head axis B2 is configured to rotate about the first head axis B1 as the head 16 rotates about the first head joint H1. Therefore, the neck 14 provides a spine-like multiple pitch joint configuration that rotates and also translates the head 16 far to minimize interference with the torso 11. The neck joint N and the head joints H1, H2 go significantly beyond standard pan/tilt units to provide extended machine vision coverage from within the head 16 that includes when the hands 26, 28 are utilizing the workspace 30 that is close to the torso 11, while achieving sufficient machine vision coverage when the hands 26, 28 are in front of the torso 11 of the robot 10.

Referring to FIG. 1, a pair of arms 22, 24, i.e., a left arm 22 and a right arm 24, extends from opposing sides of the torso 11. A pair of hands 26, 28, i.e., a left hand 26 and a right hand 28, extends from the left and right arms 22, 24, respectively. Those skilled in the art will appreciate that since the robot 10 is intended to simulate a humanoid, the various extremities—e.g., arms 22, 24, hands 26, 28, etc.—will be symmetrical and essentially include an identical symmetrical skeletal structure on both the left and right sides. Therefore, like left and right components are herein identified by like reference numbers together with the designations "L" to indicate left and "R" to indicate right. Moreover, the designations "L" and "R" have been utilized to describe the exemplary robot's 10 components; and, therefore, when viewed frontally, as in FIG. 1, the right arm 24 and right hand 28 will actually be on the left of the drawing.

Figure 2:
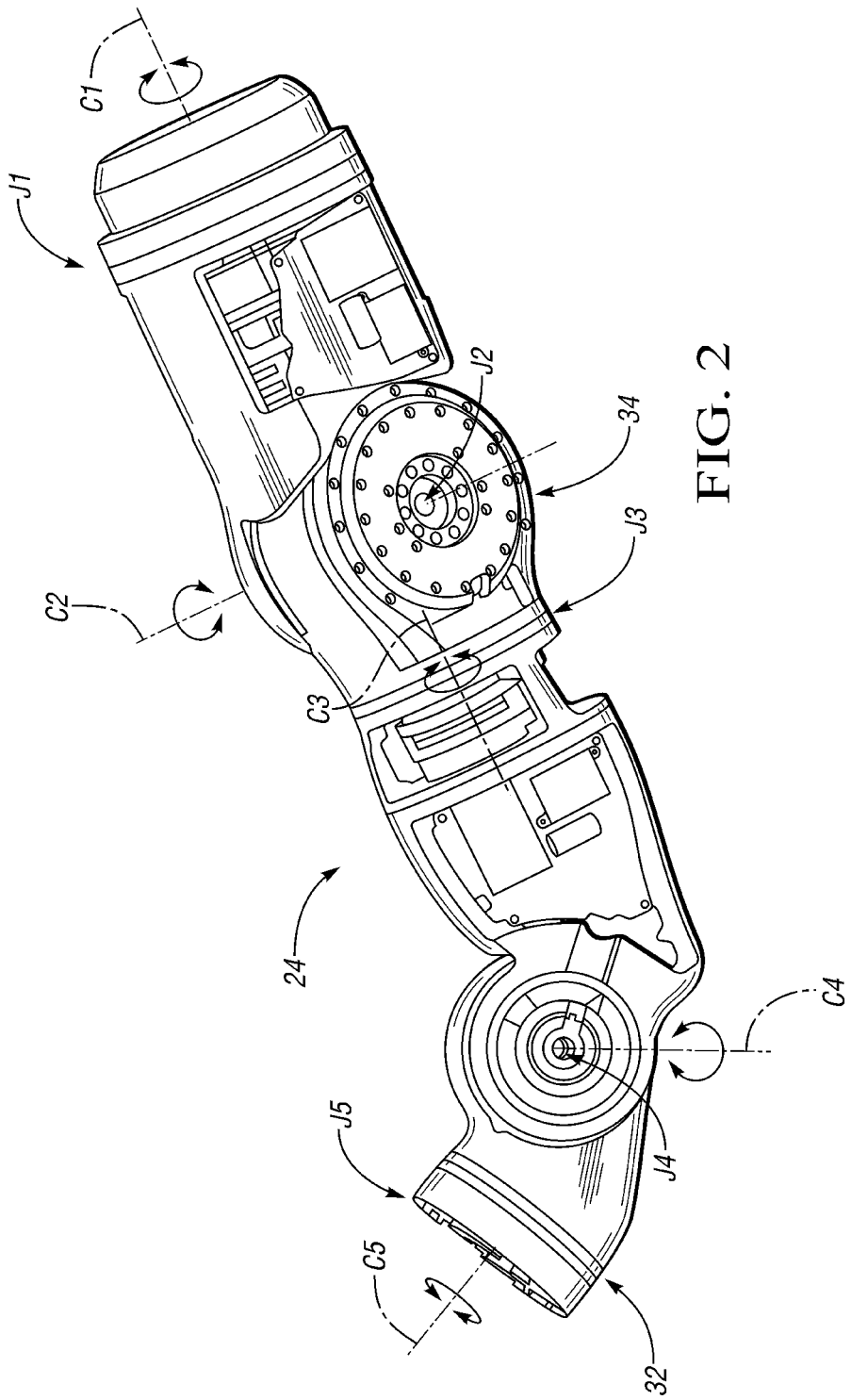
FIG. 2 is a schematic illustration of a shoulder portion and an elbow portion of one of the arms of the humanoid robot of FIG. 1.
Figure 3:
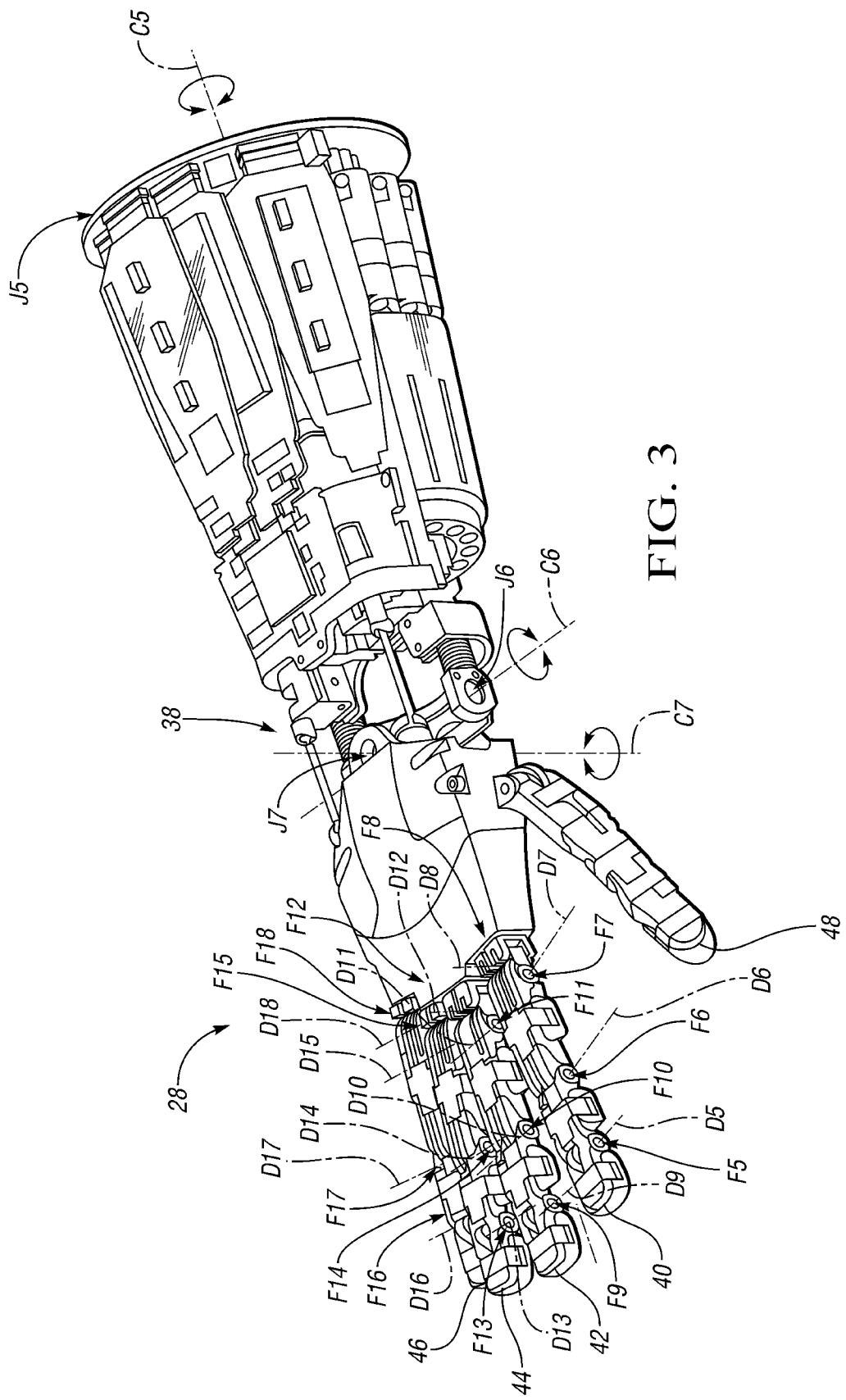
FIG. 3 is a schematic illustration of one of the hands and a wrist portion of one of the arms of the humanoid robot of FIG. 1.

Referring to FIG. 1, each arm 22, 24 has seven arm joints J1-J7 that present a corresponding seven DOF. The number of arm joints J1-J7 allows each of the arms 22, 24 to articulate with seven DOF, providing the robot 10 with a large workspace 30 (shown in FIG. 5) in front of the torso 11 and providing the robot 10 with the ability to move an elbow 32 of one or more of the arms 22, 24 while still maintaining a fixed Cartesian position and orientation for the respective hand 26, 28. Each arm 22, 24 includes a shoulder portion 34, the elbow portion 32, and a wrist portion 38 FIG. 3. Referring to FIGS. 1 and 2, the shoulder portion 34 includes a first, second, and third arm joint J1-J3 that are movable relative to the torso 11 about a first, second, and third arm axis C1-C3, respectively. The first arm axis C1 extends in generally perpendicular relationship to the second arm axis C2. The third arm axis C3 extends in generally perpendicular relationship to the second arm axis C2. The elbow portion 32 includes a fourth and a fifth arm joint J4, J5 that are movable relative to the torso 11 about a fourth and a fifth arm axis C4, C5, respectively. The fourth arm axis C4 extends in generally perpendicular relationship to the fifth arm axis C5. Referring to FIGS. 1 and 3, the wrist portion 38 includes a sixth and seventh arm joint J6, J7 that are movable relative to the torso 11 about a sixth and seventh axis C6, C7, respectively. The sixth arm axis C6 extends in generally perpendicular relationship to the seventh arm axis C7. It should be appreciated that the arm 22, 24 are not limited to having only seven DOF, as any desired number of DOF may be used as known to those skilled in the art.

Referring to FIGS. 1 and 3, each hand 26, 28 has eighteen finger joints F1-F18 that work together to provide a corresponding twelve DOF. The eighteen finger joints F1-F18 allow the hands 26, 28 of the robot 10 to achieve an accepted number of manufacturing grasps. It should be appreciated that the number of achievable manufacturing grasps are of the type known to those skilled in the art. More specifically, each hand 26, 28 includes four fingers 40-46 and an opposable thumb 48 that are configured to achieve human-like dexterous, power, and tool grasps. The four fingers 40-46 include a first and a second primary finger 40, 42 and a first and a second secondary finger 44, 46. Similar to a human hand, the hand 26, 28, including the four fingers 40-36 and the thumb 48, of the robot 10 may partially hyperextend to obtain excellent pre-grasp positions before acquiring an object or to maneuver in limited space.

Figure 4:
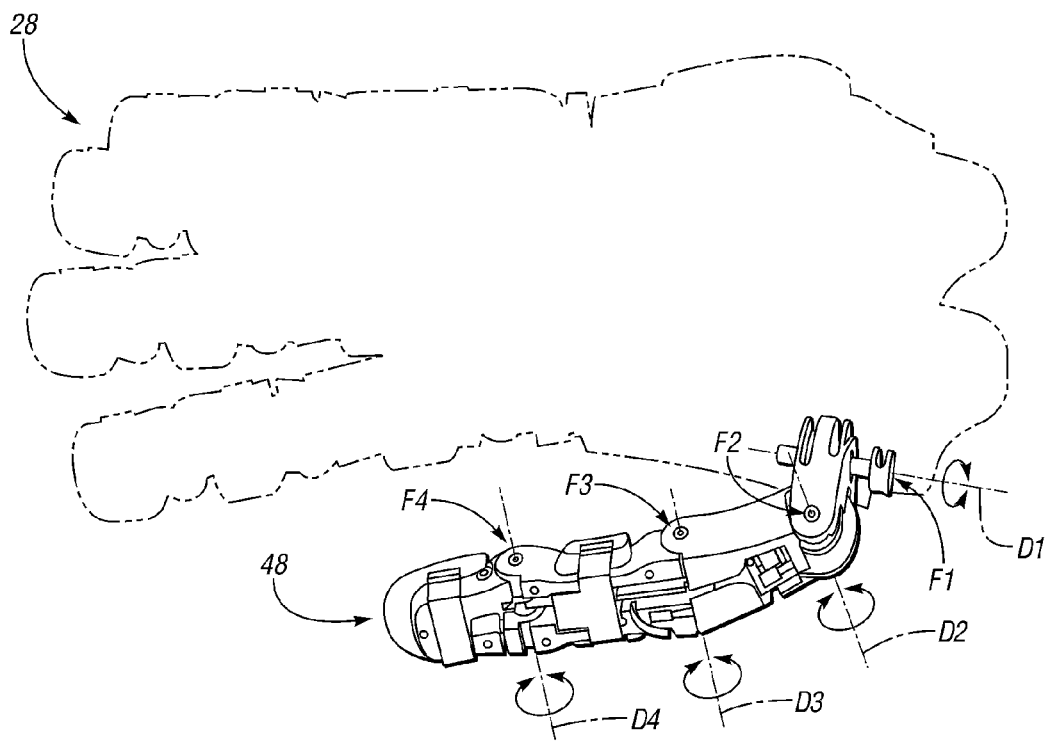

Referring to FIG. 4, each thumb 48 has a first, a second, a third, and a fourth finger joint F1-F4 that move about a first, a second, a third, and a fourth finger axis D1-D4, respectively, to provide four DOF. The four finger joints F1-F4 of the thumb 48 provide the thumb 48 with a built-in twist that may achieve near human range of motion and a wide array of relative positions with respect to the four fingers 40-46.

Referring back to FIG. 3, the four fingers 40-46 combine to provide the remaining fourteen finger joints F5-F18 and eight DOF. More specifically, the first primary finger 40 includes a fifth, a sixth, a seventh, and an eighth finger joint F5-F8 that move about a fifth, a sixth, a seventh, and an eighth finger axis D5-D8, respectively. The fifth finger joint F5 and sixth finger joint F6 are coupled by a linkage (not shown) so they rotate about the fifth finger axis D5 and sixth finger axis D6, respectively, while moving together with just one DOF. Therefore, although the first primary finger 40 has four finger joints F5-F8 there are only three independently actuated DOF. Likewise, the second primary finger 42 includes a ninth, a tenth, an eleventh and a twelfth finger joint F9-F12 that move about a ninth, a tenth, an eleventh and a twelfth finger axis D9-D12, respectively. The ninth finger joint F9 and the tenth finger joint F10 are coupled by a linkage (not shown) so they rotate about the ninth finger axis D9 and tenth finger axis D10, respectively, while moving together with just one DOF.

Therefore, although the second primary finger 42 has four finger joints F9-F12 there are only three independently actuated DOF.

The first secondary finger 44 includes an thirteenth, a fourteenth, and a fifteenth finger joint F13-F15 that move about a thirteenth, a fourteenth, and a fifteenth finger axis D13-D15. The thirteenth finger joint F13 and the fourteenth finger joint F14 are coupled by a linkage (not shown) so the thirteenth finger joint F13 and the fourteenth finger joint F14 rotate about the thirteenth finger axis D13 and fourteenth finger axis D14, respectively, while moving together with just one DOF. The second secondary finger 46 includes an sixteenth, a seventieth, and an eighteenth finger joint F16-F18 that move about a sixteenth, a seventeenth, and an eighteenth finger axis D16-D18, respectively. The sixteenth finger joint F16 and the seventeenth finger joint F17 are coupled by a linkage (not shown) so the sixteenth finger joint F16 and the seventeenth finger joint F17 rotate about the sixteenth finger axis D16 and seventeenth finger axis D16, respectively, while moving together with just one DOF.

Additionally, each secondary finger 44, 46 is underactuated, i.e. although it has two independently controllable degrees of freedom (a first joint F15, F18 and a coupled combination of a second joint F14, F17 and a third joint F13, F16), the secondary fingers 44, 46 are allocated finger actuators (not numbered) such that they can each be controlled only as a single DOF. In other words, only the sum of the angular positions of the first finger joint F15, F18 and the second finger joint F14, F17 of each secondary finger 44, 46 can be controlled, not each angular position separately. Each secondary finger 44, 46 has a single flexor tendon (not shown) and corresponding actuator for its first joint F15, F118 and second joint F14, F17. The extensor tendons for the first joint F15, F18 and the second joint F14, F17 of both secondary fingers 44, 46 share a common actuator. In this way, although the two secondary fingers 44, 46 have a total of six joints, they are allocated actuators such that they are controlled as only two DOF, and operated by just three actuators.

Referring specifically to FIGS. 2-4, while only the right arm 24 and right hand 28 is shown, it should be appreciated that the description of the finger joints F1-F18 and the corresponding finger axes D1-D18 are similar for the left hand 26. It should also be appreciated that the hands 26, 28 are not limited to having eighteen finger joints F1-F18 with twelve corresponding DOF, as any desired number of finger joints F1-F18 and DOF may be used as known to those skilled in the art.

A waist 12 is defined between a pedestal 50 and the torso 11. The pedestal 50 is configured for supporting the robot 10. The waist 12 has one waist joint W that presents a corresponding DOF. The waist 12 extends along the primary axis P. More specifically, the waist 12 rotates about the primary axis P and may be configured to provide a full 360 degrees of manipulation for the workspace 30 and viewing range of the robot 10. It should be appreciated that the waist 12 is not limited to having only one waist joint W, as any desired number of waist joints W may be used as known to those skilled in the art to provide any desired number of DOF.

Figure 5:
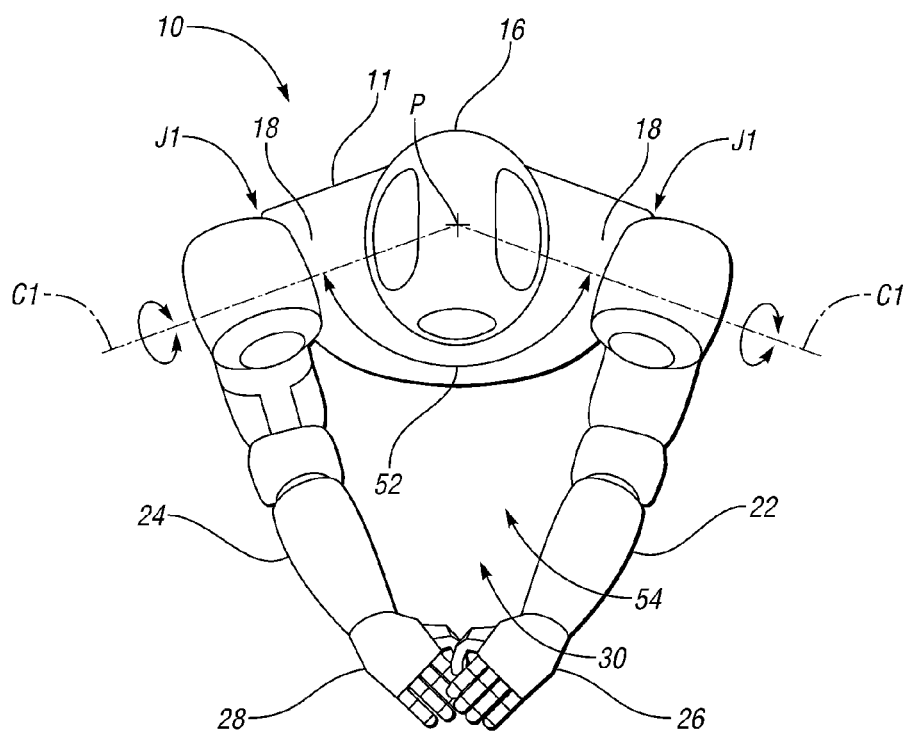
FIG. 5 is a schematic illustration of a plan view of the humanoid robot of FIG. 1, illustrating a shrug angle defined between shoulders of the humanoid robot.

The robot 10 is configured to work with both hands 26, 28 simultaneously to perform complex human tasks. Referring to FIG. 5, the shoulders 18, and therefore the arms 22, 24 and the associated hands 26, 28, are canted toward one another, relative to the neck axis A. Canting of the shoulders 18 and the associated arms 22, 24 relative to the torso 11 allows the robot 10 to achieve a shrug angle 52 that significantly increases a workspace 30 in front of the torso 11 where the hands 26, 28 can overlap and work together. This is because the workspace 30 is dependent on the shrug angle 52. More specifically, when the arms 22, 24 are mounted at the shrug angle, the robot 10 achieves a larger overlapping usable workspace 30 in front of the torso 11 of the robot 10. Referring again to FIG. 5, the shrug angle 52 may be defined as the angle between the first arm axis C1 that extends through each of the shoulders 18. The workspace 30 is defined within this shrug angle 52. An optimized shrug angle 52 of approximately 150 degrees may be used to increase the two handed 26, 28 workspace 30 by up to 50%. In addition, increasing the shrug angle 52 may also increase a volume 54 of the workspace 30. It should be appreciated that the shrug angle 52 is not limited to being only 150 degrees as any desired shrug angle 52 may be used as known to those skilled in the art. Increasing the workspace 30 via the shrug angle 52 provides two armed 22, 24 control of the robot 10, giving the robot 10 the dexterity to manipulate objects that require a two-handed grasp or to perform other two-handed operations such as assembling two objects by grasping one object in each hand 26, 28.

The robot 10 may also be configured to achieve strength and sensing levels which are consistent with manipulating substantial tools and hardware (not shown). The hands 26, 28 may be sufficiently strong to solidly grasp heavy payloads, e.g., 20 pounds and the like, when the hands 26, 28 are in any orientation. The arms 22, 24, the hands 26, 28, and the fingers 40-48 may also be configured to have a force control or the dexterity to manipulate flexible materials, small objects, human tools, and the like. The fingers 40-48 may also be configured to have enough sensitivity to detect key features for use in assembly. The arms 22, 24 may be configured to exert significantly higher loads, even when fully extended. Force sensors (not shown) may be provided in the waist 12, the arms 22, 24, and the hands 26, 28 to provide data to a control system (not shown) of the robot 10 to vary the stiffness at contact points of the robot 10. The contact points may include the hands 26, 28, fingers 40-48, elbows 32, and the like. The robot 10 stiffness may be programmed, varying from a soft touch when dealing with delicate materials to very stiff when moving a heavy weight. Tactile sensors (not shown) may be included in the fingers to identify features on objects, providing a haptic sense that augments vision when the robot 10 is performing tasks.

The robot 10 may also be configured to work side by side with humans without barriers between. The ability to eliminate any barriers between the robot 10 and the humans may be achieved by using redundant force sensors (not shown) with an independent processor to limit forces and determine unintentional contact between the robot 10 and the humans. Additionally, proximity sensors may be configured to determine when humans enter the working environment of the robot 10. When a human does enter the working environment of the robot 10, the speed of the operation of the robot 10 may automatically adjust to slow down, making the motion of the robot 10 more predictable and comfortable to the human when interacting with the robot 10. Additionally, a stiffness of the arms 22, 24, the hands 26, 28, the head 16, the torso 11, and the like may be adjusted dynamically to maintain human comfort when the humans are interacting with the robot 10. The same method that is used to adjust the stiffness of the robot 10 for interacting with tools and parts may be used to make the robot 10 soft when the human comes into contact with the robot 10. For example, a soft skin layer 56 may be disposed on the robot 10 to eliminate hard contacts between the robot 10 and the human. Additionally, the humanoid robot also is equipped with a plurality of sensors (not shown), such as force sensors, temperature, and joint position sensors machine vision and proximity sensors, or other suitable sensors may be integrated within the robot 10 to provide overlapping information on when humans enter the robot's workspace or to provide additional information about the working environment.

While the best modes for carrying out the invention have been described in detail, those familiar with the art to which this invention relates will recognize various alternative designs and embodiments for practicing the invention within the scope of the appended claims.

The invention claimed is:

1. A humanoid robot comprising:
    a torso extending along a primary axis and presenting a pair of shoulders;
    a pair of arms movably extending from a respective one of the pair of shoulders;
    wherein each of the arms includes a shoulder portion, an elbow portion, and a wrist portion;
    wherein each shoulder portion includes a first, second, and third arm joint that rotate about a first, second, and third arm axis, respectively;
    wherein each elbow portion includes a fourth and fifth arm joint that rotate about a fourth and fifth arm axis, respectively; and
    wherein each wrist portion includes a sixth and seventh arm joint that rotate about a sixth and seventh arm axis, respectively;
    a neck movably extending from the torso along the primary axis;
    wherein the neck has at least one neck joint extending generally perpendicular to the primary axis;
    wherein the neck joint is defined between the torso and a base of the neck such that the neck is configured to pitch relative to the torso about a neck axis;
    a head movably extending from the neck along the primary axis;
    wherein the head has a first and a second head joint;
    wherein the first head joint is rotatable relative to the neck about a first head axis and the second head joint is rotatable relative to the neck about a second head axis;
    wherein the first head axis extends in generally perpendicular relationship to the second head axis;
    wherein the second head axis extends in spaced and generally parallel relationship to the neck axis such that the head is configured to pitch relative to the neck about the second head axis; and
    wherein each of the shoulders are canted toward one another at a shrug angle defined between each of the shoulders such that a workspace is defined between the shoulders.

2. The robot of claim 1, wherein the shrug angle is approximately 150 degrees.

3. The robot of claim 1, wherein the shrug angle is defined between the first arm axis of each of the pair of arms.

4. The robot of claim 1, wherein the first arm axis extends in generally perpendicular relationship to the second arm axis; and
    wherein the third arm axis extends in generally perpendicular relationship to the second arm axis.

5. The robot of claim 1, wherein the fourth arm axis extends in generally perpendicular relationship to the fifth arm axis.

6. The robot of claim 1, wherein the sixth arm axis extends in generally perpendicular relationship to the seventh arm axis.

7. The robot of claim 1, further comprising two hands each operatively connected to a respective one of the pair of arms;
    wherein each of the hands has at least twelve independent degrees of freedom.

8. The robot of claim 7, wherein each of the hands includes at least five fingers.

9. The robot of claim 8, wherein the five fingers include a thumb, a first primary finger, a second primary finger, a first secondary finger, and a second secondary finger;
    wherein the thumb has at least four finger joints presenting at least four degrees of freedom;
    wherein each of the primary fingers has at least three finger joints presenting at least three degrees of freedom;
    wherein each of the secondary fingers has at least three finger joints presenting at least one degree of freedom.

10. The robot of claim 9, wherein the thumb includes a first, second, third, and fourth finger joint that rotate about a first, second, third, and fourth finger joint axis, respectively;
    wherein the first primary finger includes a fifth, sixth, a seventh and an eighth finger joint that rotate about a fifth, sixth, a seventh, and an eighth finger axis, respectively;
    wherein the second primary finger includes a ninth, a tenth, an eleventh and a twelfth finger joint that rotate about a ninth, a tenth, an eleventh, and a twelfth finger axis, respectively;
    wherein the first secondary finger includes a thirteenth, a fourteenth, and a fifteenth finger joint that rotate about a thirteenth, a fourteenth, and a fifteenth finger axis, respectively; and
    wherein the second secondary finger includes a sixteenth, a seventeenth, and an eighteenth finger joint that rotate about a sixteenth, a seventeenth, and an eighteenth twelfth finger axis, respectively.

11. The robot of claim 1, further comprising a pedestal;
    wherein the torso movably extends from the pedestal along the primary axis;
    wherein a waist joint is defined between the torso and the pedestal.

12. The robot of claim 11, wherein the waist joint is rotatable about the primary axis.

13. A humanoid robot comprising:
    a torso extending along a primary axis and presenting a pair of shoulders;
    a pair of arms movably extending from a respective one of the pair of shoulders;
    a hand operatively connected to a respective one of the pair of arms;
    a neck movably extending from the torso along the primary axis;
    wherein the neck has at least one neck joint extending generally perpendicular to the primary axis;
    wherein the neck joint is defined between the torso and a base of the neck such that the neck is configured to pitch relative to the torso about a neck axis;
    a head movably extending from the neck along the primary axis;
    wherein the head has a first and a second head joint;
    wherein the first head joint is rotatable relative to the neck about a first head axis and the second head joint is rotatable about a second head axis;
    wherein the first head axis extends in generally perpendicular relationship to the second head axis;
    wherein the second head axis extends in spaced and generally parallel relationship to the neck axis such that the head is configured to pitch relative to the neck about the second head axis.

14. A humanoid robot comprising:
    a torso extending along a primary axis and presenting a pair of shoulders;
    a pair of arms movably extending from a respective one of the pair of shoulders;

wherein each of the arms has at least seven arm joints, presenting seven degrees of freedom;
a pair of hands movably extending from a respective one of the pair of arms;
wherein each of the hands has at least twelve finger joints;
a head movably extending along the primary axis;
wherein the head has at least one head joint;
a neck movably extending from the torso along the primary axis;
wherein the neck has at least one neck joint extending generally perpendicular to the primary axis;
wherein the neck joint is defined between the torso and a base of the neck such that the neck is configured to pitch relative to the torso about a neck axis;
a head movably extending from the neck along the primary axis;
wherein the head has a head joint;
wherein the head joint is rotatable about a head axis;
wherein the head axis extends in spaced and generally parallel relationship to the neck axis such that the head is configured to pitch relative to the neck about the head axis; and
wherein each of the shoulders are canted toward one another at a shrug angle defined between each of the shoulders such that a workspace is defined between the shoulders.

15. A humanoid robot, as set forth in claim 14, wherein the shrug angle is about 150 degrees.

\* \* \* \* \*